(12) United States Patent
Bashford et al.

(10) Patent No.: US 7,370,139 B2
(45) Date of Patent: May 6, 2008

(54) METHODS AND STRUCTURES FOR EFFICIENT STORAGE OF TASK FILE INFORMATION IN SERIAL ATA ENVIRONMENTS

(75) Inventors: Patrick R. Bashford, Fort Collins, CO (US); Brian A. Day, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 370 days.

(21) Appl. No.: 10/993,283

(22) Filed: Nov. 19, 2004

(65) Prior Publication Data

US 2006/0112216 A1 May 25, 2006

(51) Int. Cl.
*G06F 12/00* (2006.01)
(52) U.S. Cl. .................................. 711/104
(58) Field of Classification Search ............. 711/104, 711/105, 147, 151, 158
See application file for complete search history.

(56) References Cited

U.S. PATENT DOCUMENTS

| 5,881,311 | A | 3/1999 | Woods |
| 6,880,022 | B1 | 4/2005 | Waldspurger et al. |
| 6,965,956 | B1 | 11/2005 | Herz et al. |
| 2005/0027900 | A1* | 2/2005 | Pettey .................. 710/22 |
| 2005/0166014 | A1 | 7/2005 | Kobayashi et al. |

* cited by examiner

*Primary Examiner*—Hiep T. Nguyen
(74) *Attorney, Agent, or Firm*—Duft, Bornsen & Fishman

(57) ABSTRACT

Methods and structures for efficiently storing task file information for a significant number of SATA devices coupled to a SATA storage controller. A RAM memory within the SATA storage controller may store task file information for virtually any number of SATA devices coupled to a SAS communication domain. An arbiter and multiplexing logic is coupled to multiple client logic blocks or processes of the controller each operable to control one or more corresponding SATA devices. The arbiter and associated multiplexing logic grants each client process an opportunity to control its corresponding devices by retrieving saved state information from the task file RAM storage.

15 Claims, 3 Drawing Sheets

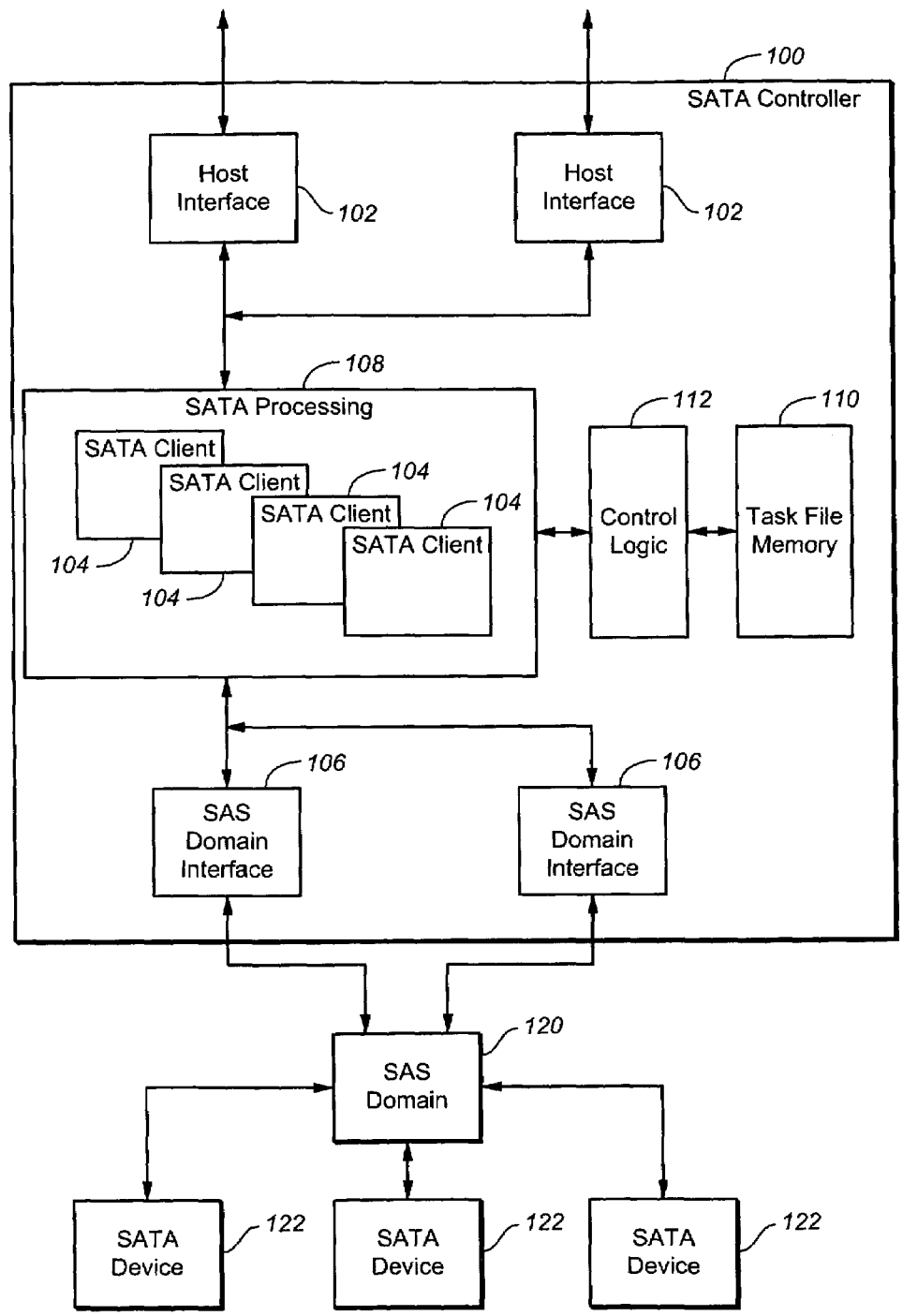
FIG._1

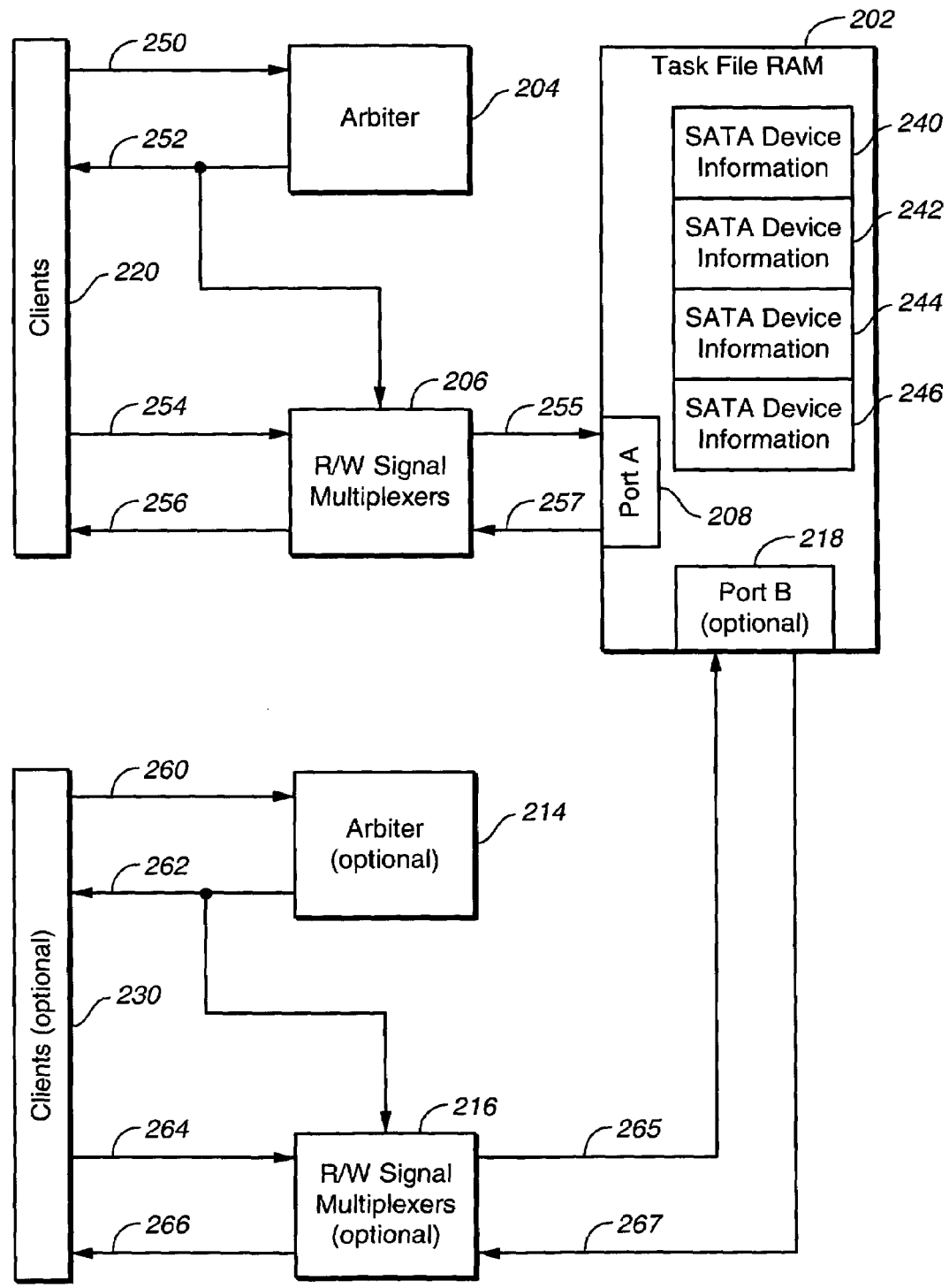
FIG._2

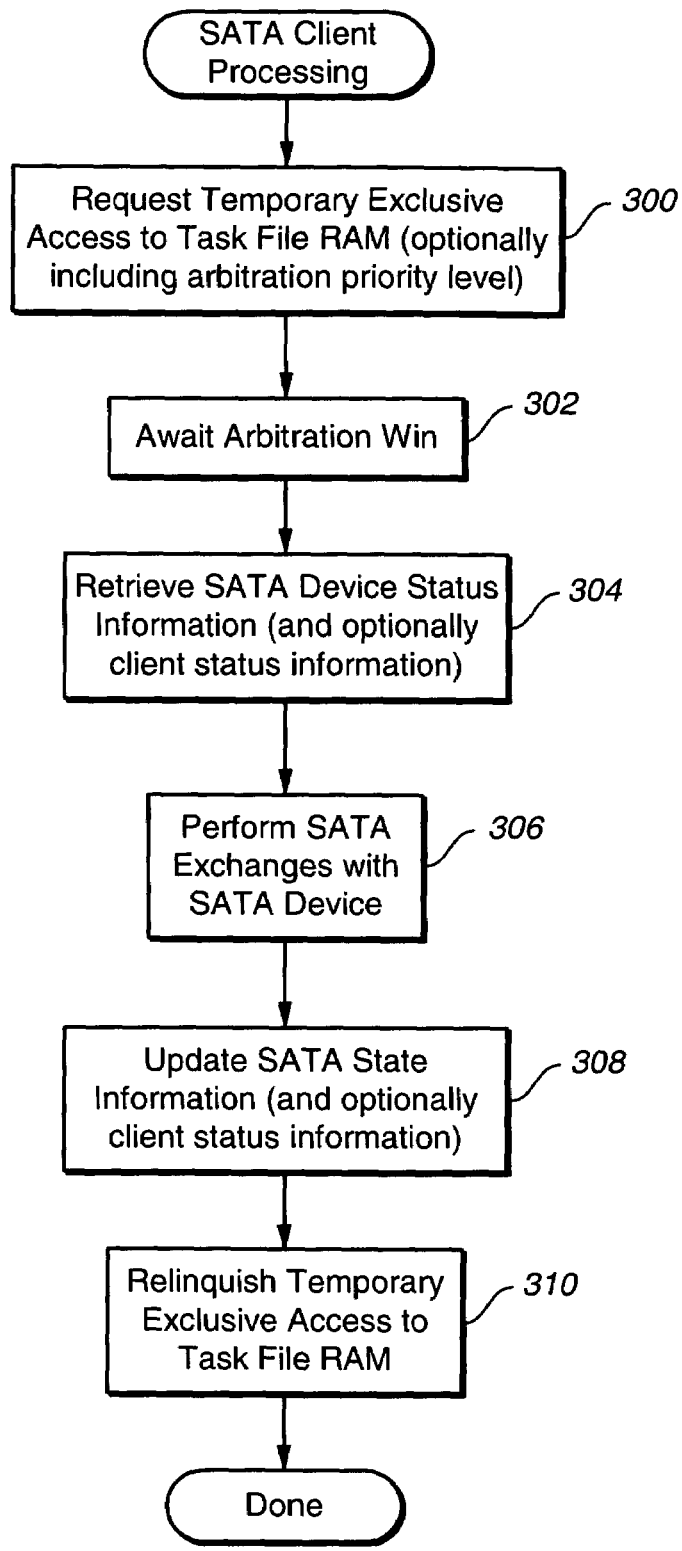
FIG._3

METHODS AND STRUCTURES FOR EFFICIENT STORAGE OF TASK FILE INFORMATION IN SERIAL ATA ENVIRONMENTS

BACKGROUND OF THE INVENTION

1. Field of the Invention

The present invention relates to Serial Advanced Technology Attachment (SATA) storage devices and controllers and more specifically relates to efficient methods and structures for storing task file information (e.g., command block register information and control block register information) for a large number of SATA devices.

2. Discussion of Related Art

AT attachment and AT attachment with packet interface (ATA and ATAPI, respectively) have been, and remain, widely accepted standards for coupling disk drives to storage controller devices associated with host systems. The ATA and ATAPI specifications utilize standardized register definitions for exchanging information between a compliant storage controller and one or more storage devices (i.e., disk drives or other compliant storage devices). Originally, these registers were referred to collectively as a "task file". Later evolutionary developments of the ATA and ATAPI specifications began referring to these registers in separate portions as command block registers and control block registers. Some of the registers provide command or control information to the storage device while others record status information from the storage device. As used herein, "task file" refers to the earlier register definitions as well as the later evolutionary definitions of command block registers and control block registers.

The host storage controller interacts with each storage device in accordance with information exchanged through the corresponding task file (i.e., the corresponding register values). Various of the register values corresponding to each device are key to operation of state machines or other control logic defined by the ATA and ATAPI specifications for proper interaction between the storage device and the corresponding storage controller. Since a single ATA or ATAPI compliant storage controller may interact with multiple ATA or ATAPI compliant storage devices, the state information for each device reflected in the task file for each device was generally saved within the storage controller to assure continued, proper operation of the state machine as multiple devices would asynchronously interact with the storage controller. Further, a storage controller may process requests substantially in parallel (concurrently) on behalf of multiple clients (multiple requests from one or more host system processes). Each client may access one or more devices and each device may be accessed by one or more such clients.

Historically, storage controllers compliant with the ATA or ATAPI specifications would store task file information for each of the multiple storage devices with which the storage controller may interact. This saved task file information within the storage controller typically utilize register logic structures based on multiple flip flops and corresponding combinatorial logic to store task file information for each device. Typical storage controllers designed for ATA and ATAPI compliant devices permitted storage of task file information for up to eight storage devices.

Later developments in storage devices utilized ATA or ATAPI compliant register exchanges encapsulated within Serial Attached SCSI (SAS) protocol and communication architectures. So-called Serial ATA (SATA) protocols were developed to utilize high speed serial interfaces and have been applied with the SAS specifications to exchange information using the ATA or ATAPI register oriented command and control structures. A SATA controller or host adapter, like the earlier ATA or ATAPI storage controllers, therefore required storage of task file information for multiple SATA devices under its control. Utilizing the legacy approach of register and flip flop based storage components presents numerous problems in expanding the number of SATA devices under the control of a SATA storage controller or host bus adapter. In accordance with SATA specifications utilizing SAS transmission protocols, as many as 4096 SAS devices could be supported any of which could be compliant with SATA protocol specifications. Even a minimal, first generation, SAS compliant storage controller or host bus adapter was capable of supporting at least 128 SATA devices. Creating register structures to store task file information for each of such numerous SATA devices utilized a substantial portion of the silicon surface area of an integrated circuit or other discrete circuit structures within the SAS storage controller or host bus adapter. Such register file constructs, though simple and relatively inexpensive for a small number of registers, adds significant cost and complexity where the number of storage devices, and hence the number of related register files, grows dramatically.

It is evident from the above discussion that a need exists for improved methods and structures for storing task file information for a large number of SATA devices in a high speed SAS storage environment.

SUMMARY OF THE INVENTION

The present invention solves the above and other problems, thereby advancing the state of the useful hearts, by providing methods and associated structures for using a RAM memory device and corresponding arbitration and multiplexing logic to allow multiple clients to utilize a storage controller coupled to a large number of SATA devices. The RAM structure may store task file information for virtually any number of SATA devices in a simpler, less costly memory structure as compared to prior register/flip flop based memory structures. In one aspect hereof, a RAM memory component stores task file information for each of a plurality of SATA devices and is indexed by an offset value represented as the SATA device number. An arbiter and corresponding multiplexer logic may be coupled to each of a plurality of client logic components each managing one or more corresponding SATA devices on behalf of a host based system or application. As each SAS client is granted permission to continue operation with one of its corresponding SATA devices, the arbitration and multiplexing logic couples the client logic to the task file RAM to retrieve necessary state information from the saved task file information stored in the task file RAM.

A feature hereof therefore provides an apparatus in a SATA controller for managing task file information, the apparatus comprising: a RAM element for storing SATA task file information for each of a plurality of SATA device; and control logic to selectively couple a select client of a plurality of clients to the RAM element to retrieve and/or store SATA task file information therein.

Another aspect hereof further provides that the control logic further comprises: multiplexer logic to selectively couple the select client to the RAM element to store or retrieve SATA task file information.

Another aspect hereof further provides that the control logic further comprises: an arbiter for arbitrating among the plurality of clients to select the select client for access to the RAM memory element.

Another aspect hereof further provides that the arbiter further comprises: a round-robin arbiter for sequencing through each of the plurality of clients requesting access to the RAM element to select the select client.

Another aspect hereof further provides that the arbiter further comprises: a priority-based arbiter for selecting the select client from among the plurality of clients requesting access to the RAM element based on a priority value associated with each client of the plurality of clients.

Another aspect hereof further provides that the SATA task file information further comprises: status information regarding an associated SATA device.

Another aspect hereof further provides that the RAM element further comprises: a multi-ported RAM element.

Another aspect hereof further provides for: a plurality of arbiters each associated with a corresponding port of the multi-ported RAM element wherein each arbiter is adapted for arbitrating among the plurality of clients to select the select client for access to the corresponding port of the RAM memory element; and a corresponding plurality of multiplexer elements each associated with a corresponding arbiter of the plurality of arbiters wherein each multiplexer is adapted for selectively coupling the select client to the corresponding port of the RAM element to store or retrieve SATA task file information.

Another feature hereof also provides a method operable in a SATA storage controller having multiple clients each adapted to control one or more SATA devices, the method for managing SATA task information comprising: retrieving from a RAM memory element SATA task file information regarding a particular SATA device logically coupled to a particular client of the plurality of clients; and updating the SATA task file information in the RAM memory element in response to exchanges between the particular SATA device and the particular client, wherein the RAM memory element is shared by all of the plurality of clients.

Another aspect hereof further provides for: arbitrating among the plurality of clients to grant temporary exclusive access of the RAM memory element to a requesting client of the plurality of clients.

Another aspect hereof further provides that the step of arbitrating further comprises: arbitrating among all requesting clients of the plurality of clients to provide fairness in the granting of temporary exclusive access to all requesting clients.

Another aspect hereof further provides that the step of arbitrating further comprises: arbitrating among all requesting clients of the plurality of clients based on a priority attribute associated with each requesting client such that a highest priority client of the requesting clients is granted temporary exclusive access.

Another aspect hereof further provides that wherein the step of retrieving further comprises retrieving state information regarding the particular SATA device, and wherein the step of updating further comprises updating state information regarding the particular SATA device.

Another aspect hereof further provides that wherein the step of retrieving further comprises retrieving client specific information regarding the particular SATA device, and wherein the step of updating further comprises updating client specific information regarding the particular SATA device.

Another aspect hereof further provides that wherein the step of retrieving further comprises retrieving client specific information regarding the particular client, and wherein the step of updating further comprises updating client specific information regarding the particular client.

BRIEF DESCRIPTION OF THE DRAWINGS

FIG. 1 is a block diagram of an exemplary SATA controller enhanced in accordance with features and aspects hereof to utilize SATA task file information stored in a RAM element accessible by each of a plurality of clients.

FIG. 2 is a block diagram providing additional details of an exemplary embodiment of a task file RAM element and associated control logic in accordance with features and aspects hereof.

FIG. 3 is a flowchart describing an exemplary process operable in a SATA client within a SATA storage controller enhanced in accordance with features and aspects hereof to manipulate SATA task file information in a shared RAM element.

DETAILED DESCRIPTION OF THE DRAWINGS

FIG. 1 is a block diagram of a SATA controller 100 enhanced in accordance with features and aspects hereof. SATA controller 100 may include one or more host interface elements 102 for coupling the host controller SATA controller 100 to host systems and devices. Where the SATA controller 100 is a host bus adapter configured for direct coupling within the host system such as a personal computer or workstation, host interface elements 102 may merely adapt the SATA controller 100 for exchange of information through the host system processor or peripheral bus. For example, host interface 102 may adapt the SATA controller 100 as a host bus adapter for communication with the host system via PCI bus exchanges or other similar processor and peripheral bus media and protocols. Where the SATA controller 100 is a storage controller logically housed within a standalone storage subsystem, host interfacing elements 102 may couple the SATA controller and hence the entire storage subsystem to one or more host systems through other well-known media and protocols. For example, host interface 102 may couple the SATA controller 100, and hence a corresponding storage subsystem housing the controller, to host systems via Fibre Channel or other high speed serial media and protocols, SCSI, and other network storage protocols and media.

SATA controller 100 may also include SATA processing element 108 for generating, formatting, and exchanging information with SATA compatible devices using SATA protocols. SATA processing element 108 may comprise one or more SATA clients 104. Each SATA client 104 may be responsible for coordinating communications on behalf of requests from a corresponding host system application or process. As generally known in the art, each SATA client 104 may include processing means to receive and process requests from attached host systems and may also include state control logic to exchange appropriate information with one or more SATA devices 122. Each SATA client 104 may therefore interact with one or more SATA devices to manage requests on behalf of the corresponding host based application or process.

The SATA clients 104 manage SATA protocol formatted exchanges for application to SATA devices 122 via SAS domain 120 and one or more SAS domain interfaces 106. SAS domain 120 may comprise a number of SAS ports often provided by SAS expanders. Each SATA controller may be coupled to the SAS domain 120 via one or more ports and each SATA device 122 may be coupled to SAS domain 120 via one or more ports thus allowing SATA controllers 100 to be coupled to any of the plurality of SATA devices 122 through one or more paths of the SAS domain 120. SATA information exchanges are encapsulated for transmission through the SAS domain using SAS protocols as widely known in the art.

SATA controller 100 is enhanced in accordance with features and aspects hereof to provide task file memory 110 accessed by SATA processing element 108 in conjunction with control logical 112. As noted above, SATA controllers as presently practiced in the art generally utilize register files for storing so called "task file" information regarding SATA devices. The registers corresponding to each SATA device are used to store and retrieve status information for each SATA device so that each SATA client may share present status information regarding SATA devices with which it interacts. Such register files add significant cost and complexity as the number of SATA devices being managed by SATA processing element 108 increases. By contrast, features and aspects hereof utilize a task file memory 110 that comprises a RAM memory element used for storing information about a potentially large number of SATA devices. Such a RAM memory element significantly simplifies structure of a SATA controller as compared to prior known techniques utilizing significant numbers of register files for storing such information. Control logic 112 coordinates access to the shared task file memory 110 by the multiple SATA clients 104 that comprise SATA processing element 108. As discussed further herein below, control logical 112 may include, for example, arbitration logic to arbitrate among multiple SATA clients 104 each requesting access to task file memory 110 and may include multiplexing logic to selectively couple a selected client of the plurality of requesting clients 104 to the task file memory 110.

Those of ordinary skill in the art will readily recognize that the SATA controller 100 of FIG. 1 is intended merely as representative of a typical SATA controller architecture and configuration enhanced with features and aspects hereof. Numerous equivalent structures will be readily apparent to those of ordinary skill in the art for providing the enhanced features and aspects hereof. In particular, those of ordinary skill in the art will recognize that SATA processing element 108 may be implemented as one or more general purpose and/or special purpose processing elements with associated program memory and data storage memory. Such processors may execute programmed instructions to manage the multiple SATA devices using the shared task file memory element 110. Alternatively, SATA processing element 108 may comprise a plurality of special purpose application specific circuits each corresponding to a SATA client 104 operable to manipulate one or more SATA devices 122 on behalf of a requesting host system application or process. In general, multiple SATA clients 104 may therefore be implemented as multiple software processes operable within one or more general or special purpose processors or may be implemented as one or more special purpose custom circuits each adapted for managing of one or more SATA clients 104. Such design choices will be readily apparent to those of ordinary skill in the art. Still further, those of ordinary skill in the art will readily recognize that SATA controller 100 may incorporate any number of host interface elements 102 and SAS domain interface elements 106 for providing flexible, scalable connectivity to host systems and to one or more SAS domains 120.

FIG. 2 is a block diagram providing additional details of an exemplary embodiment of a task file RAM 202 and associated arbitration and multiplexing logic. Task file RAM 202 may be any suitable RAM memory device including, for example, SDRAM or other appropriate dynamic RAM memory components. SATA device information 240, 242, 244, and 246 may be resident within task file RAM 202 representing state or other information regarding each of a corresponding plurality of SATA devices. SATA device information may include state information or other status information regarding a corresponding SATA device. Further, SATA device information may include client specific information relating the present state of control by one or more SATA clients presently engaged in exchanges with a corresponding SATA device. In general, SATA state information useful for operating a state machine within a corresponding client may be stored to permit the SATA client to operate in accordance with state machine logic described in the SATA specifications. Those of ordinary skill in the art will readily recognize the minimal set of useful SATA state information as well as other useful status information that may be stored in the corresponding SATA device information entry 240 through 246.

Task file RAM 202 may include port A 208 for interacting with a first subset of SATA clients 220 in conjunction with arbiter 204 and multiplexers 206. Optionally, task file RAM 202 may provide multiple ports so as to include, for example, port B 218 for interacting with other SATA clients 230 in conjunction with arbiter 214 and multiplexers 216. Such multiple ports on task file RAM 202 may provide additional flexibility within a corresponding SATA controller to permit multiple clients to simultaneously access information stored in task file RAM 202. Numerous configurations will be readily apparent to those of ordinary skill in the art for dividing SATA clients between a first subset of SATA clients 220 and a second subset of SATA clients 230. For example, clients associated with the first port A 208 of task file RAM 202 may be higher priority than SATA clients 230 associated with a second port B 218 of task file RAM 202. Other configurations that may group SATA clients 220 and SATA clients 230 based on other performance goals or attributes will be readily apparent to those of ordinary skill in the art. As noted above, such multiple ports of task file RAM 202 are not necessary but may be a useful enhancement in certain applications of features and aspects hereof.

Clients 220 interact with task file RAM 202 through port A 208 in conjunction with control logic comprising arbiter 204 and multiplexers 206. When one or more SATA clients 220 require access to information stored in task file RAM 202, each requesting client may assert a request signal applied to arbiter 204 through signal path 250. Arbiter 204 selects an appropriate selected client based on any well-known arbitration technique. For example, arbiter 204 may select among concurrently requesting SATA clients 220 by simply applying round robin selection techniques to help assure fairness in allocating access to shared task file RAM 202 among all clients 220. Alternatively, a priority based arbitration scheme may be used wherein each client 220 applies a priority signal or otherwise indicates a priority in conjunction with its request applied to path 250. Arbiter 204 may then select the highest priority client among those presently requesting access to shared task file RAM 202. Those of ordinary skill in the art will recognize a wide variety of arbitration techniques and corresponding logic for implementing arbiter 204 to achieve desired performance and fairness goals of a particular application.

In selecting a next client 220 to grant access to RAM 202, arbiter 204 applies an arbitration grant signal to path 252 for the selected client 220. The request grant signal is also applied as a selection input to read/write signal multiplexers 206 for selectively applying read and write related signals from the selected client 220 to the corresponding signal paths of port A 208 in task file RAM 202. In particular, read/write signal multiplexers 206 receive write related signals from the selected client 220 via path 254 and apply those signals through path 255 to port A 208 of task file RAM 202. In like manner, read/write signal multiplexers 206 receive read related signals from port A 208 of task file RAM 202 on path 257 and apply the read related signals via path 256 to the selected client 220. The particular read and write signals so multiplexed may include various control and status signals as well as data signals for exchange of read and write information between a selected client 220 and port A 208 of task file RAM 202. Those of ordinary skill in the art will recognize numerous multiplexing techniques and circuits for selectively applying signals from a selected SATA client 220 for selectively exchanging signals between a selected SATA client 220 and task file RAM 202. Such multiplexing architectures are widely known to those of ordinary skill in the art.

As noted above, task file RAM 202 may optionally include multiple ports such that an optional port B 218 may interact with a second subset of SATA clients 230 in conjunction with control logic comprising arbiter 214 and multiplexers 216. Arbiter 214 and multiplexers 216 are configured and operable similar to that of arbiter 204 and multiplexers 206, respectively. Clients 230 request access to shared task file RAM 202 by applying request signals to arbiter 214 via path 260. Arbiter 214 applies any desired arbitration technique to grant one of the requesting SATA clients temporary exclusive access to task file RAM 202. A grant signal is applied to the selected SATA client 230 via path 262 and is similarly applied to multiplexers 216. Multiplexers 216 selectively couple signals from the selected SATA client 230 via paths 264 and 266 to port B 218 of RAM 202 via paths 265 and 267, respectively.

Those of ordinary skill in the art will readily recognize that any number of such ports may be configured for operation of task file RAM 202. Further, those of ordinary skill in the art will readily recognize appropriate logic circuits and techniques for implementing control logic features of arbiters 204 and 214 and of multiplexers 206 and 216. Further, those of ordinary skill in the art will readily recognize that any number of clients 220 and 230 may be coupled through appropriate control logic to share access to task file RAM 202. Still further, those of ordinary skill in the art will readily recognize that SATA device information 240 through 246 may include minimal state information associated with a corresponding SATA device as well as client specific or other related useful information for permitting each of multiple SATA clients to communicate with a corresponding SATA device. The structure of FIG. 2 is therefore intended merely as exemplary of one possible embodiment of features and aspects hereof to provide a shared task file RAM 202 for storing information regarding each of multiple SATA devices for use by multiple clients 220 and 230.

FIG. 3 is a flowchart describing operation of a SATA client in accordance with features and aspects hereof to store and retrieve SATA device information in a shared task file RAM memory element. Element 300 of FIG. 3 is first operable to request temporary exclusive access to the task file RAM. As noted above, the request may include priority information or may otherwise identify the priority of the requesting SATA client. The arbitration element receiving such a request may utilize any of several well-known arbitration techniques including simple round robin arbitration or priority-based arbitration. Further, those of ordinary skill in the art will recognize that where priority-based arbitration is implemented, the priority information associated with each SATA client may be dynamically communicated to the arbiter along with the request for temporary exclusive access or may be statically configured within the arbiter or related circuits. Element 302 then awaits a grant signal from the arbiter indicating that this SATA client has been selected for the grant of temporary exclusive access to the task file RAM. As noted above, the grant signal may be generated by the arbiter in the form of a discreet signal applied to the selected client. In addition, a request and grant signal may be exchanged as messages over a communication medium coupling the arbiter to the multiple clients. Requesting and "winning" such an arbitration assures the selected SATA client that it has temporary exclusive access to the shared task file RAM memory element.

Those of ordinary skill in the art will also recognize that the temporary exclusive access may be requested and granted for subsets or portions of the task file RAM corresponding to particular subsets of SATA devices or may be granted for the entirety of the contents of the task file RAM memory element.

Upon receiving temporary exclusive access indicated by the grant signal from the arbiter, element 304 is then operable to retrieve SATA device status information and, optionally, other client or device specific status information from the shared task file RAM. As noted above, the shared task file RAM includes a portion associated with each of the plurality of SATA devices coupled to the SATA controller. The particular portion of the task file RAM memory to be accessed for a particular SATA device may be identified by an index or offset value associated with a SATA device ID or other indicia associated with a particular SATA device. Numerous equivalent indexing and offset techniques to associate a particular portion of the task file RAM with a particular SATA device will be readily apparent to those of ordinary skill in the art.

Having retrieved current SATA device status information and optionally other client status information, element 306 a is next operable to perform appropriate SATA compatible exchanges with the SATA device. The presently selected SATA client performs appropriate SATA exchanges in accordance with the state machine logic and other standards provided by the SATA specifications. Such processing is well known to those of ordinary skill in the art and well documented in the SATA and SAS protocol specifications. Upon completion of the SATA exchanges by element 306, element 308 is next operable to update the SATA device state information and optionally related client status information within the task file RAM memory element. By updating the status information associated with the SATA device and the SATA client, the presently selected SATA client or another later selected SATA client may continue interactions and exchanges with the SATA device based upon properly updated SATA device state information.

Lastly, element 310 is operable to relinquish the temporary exclusive access to the task file RAM by the presently selected SATA client. Relinquishment of the temporary exclusive access may be indicated to the arbiter by any of several well-known techniques, messages, and signals.

The method of FIG. 3 provides for storing and retrieving status information regarding SATA device exchanges with one or more SATA clients without the need for costly, complex register file structures associated with each of a plurality of SATA devices. Rather, the method of FIG. 3 in accordance with features and aspects hereof provides for recording and retrieving such status information in a simpler, less costly RAM memory structure. Utilization of such a RAM memory structure in accordance with features and aspects hereof provides additional flexibility and scalability in the number of SATA devices that may be controlled by a SATA controller. Virtually any number of SATA devices may be managed by a static controller enhanced in accordance with features and aspects hereof to utilize the task file RAM structure.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. In a Serial Advanced Technology Attached ("SATA") controller, apparatus for managing task file information comprising:
    a RAM element for storing SATA task file information for each of a plurality of SATA devices wherein said task file information contains control information for each of the plurality of SATA devices; and
    control logic to selectively couple a select client of a plurality of clients to the RAM element to retrieve and/or store SATA task file information therein.

2. The apparatus of claim 1 wherein the control logic further comprises:
    multiplexer logic to selectively couple the select client to the RAM element to store or retrieve SATA task file information.

3. The apparatus of claim 2 wherein the control logic further comprises:
    an arbiter for arbitrating among the plurality of clients to select the select client for access to the RAM memory element.

4. The apparatus of claim 3 wherein the arbiter further comprises:
    a round-robin arbiter for sequencing through each of the plurality of clients requesting access to the RAM element to select the select client.

5. The apparatus of claim 3 wherein the arbiter further comprises:
    a priority-based arbiter for selecting the select client from among the plurality of clients requesting access to the RAM element based on a priority value associated with each client of the plurality of clients.

6. The apparatus of claim 1 wherein the SATA task file information further comprises:
    status information regarding an associated SATA device.

7. The apparatus of claim 1 wherein the RAM element further comprises:
    a multi-ported RAM element.

8. The apparatus of claim 7 further comprising:
    a plurality of arbiters each associated with a corresponding port of the multi-ported RAM element wherein each arbiter is adapted for arbitrating among the plurality of clients to select the select client for access to the corresponding port of the RAM memory element; and
    a corresponding plurality of multiplexer elements each associated with a corresponding arbiter of the plurality of arbiters wherein each multiplexer is adapted for selectively coupling the select client to the corresponding port of the RAM element to store or retrieve SATA task file information.

9. In a Serial Advanced Technology Attached ("SATA") storage controller having multiple clients each adapted to control one or more SATA devices, a method for managing SATA task information comprising:
    retrieving from a RAM memory element SATA task file information regarding a particular SATA device logically coupled to a particular client of the plurality of clients wherein said task file information contains control information for the particular SATA device; and
    updating the SATA task file information in the RAM memory element in response to exchanges between the particular SATA device and the particular client,
    wherein the RAM memory element is shared by all of the plurality of clients.

10. The method of claim 9 further comprising:
    arbitrating among the plurality of clients to grant temporary exclusive access of the RAM memory element to a requesting client of the plurality of clients.

11. The method of claim 10 wherein the step of arbitrating further comprises:
    arbitrating among all requesting clients of the plurality of clients to provide fairness in the granting of temporary exclusive access to all requesting clients.

12. The method of claim 10 wherein the step of arbitrating further comprises:
    arbitrating among all requesting clients of the plurality of clients based on a priority attribute associated with each requesting client such that a highest priority client of the requesting clients is granted temporary exclusive access.

13. The method of claim 9
    wherein the step of retrieving further comprises retrieving state information regarding the particular SATA device, and
    wherein the step of updating further comprises updating state information regarding the particular SATA device.

14. The method of claim 13
    wherein the step of retrieving further comprises retrieving client specific information regarding the particular SATA device, and
    wherein the step of updating further comprises updating client specific information regarding the particular SATA device.

15. The method of claim 13
    wherein the step of retrieving further comprises retrieving client specific information regarding the particular client, and
    wherein the step of updating further comprises updating client specific information regarding the particular client.

* * * * *